Figure 2:
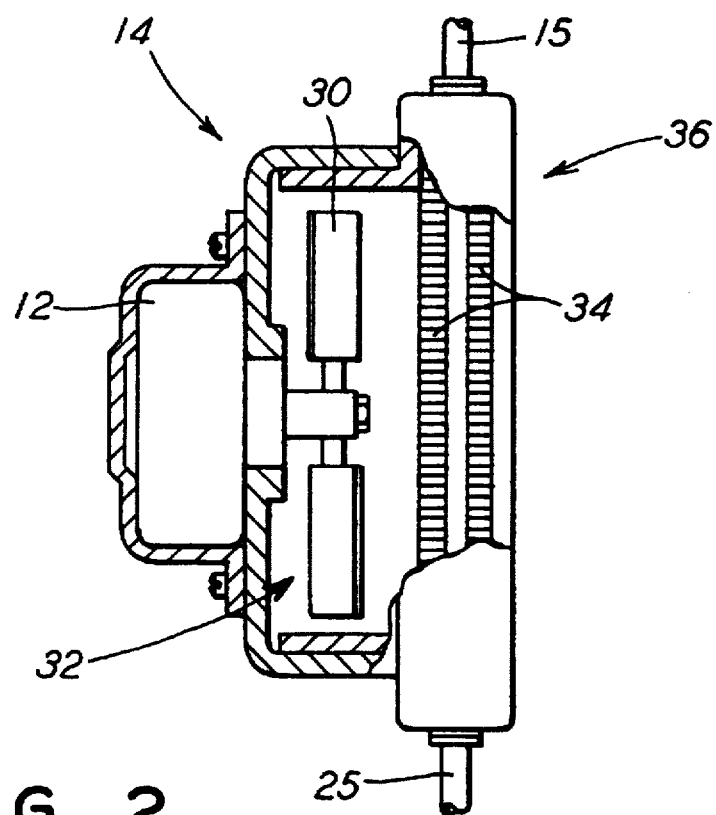

United States Patent
Wagner et al.

[11] Patent Number: 5,894,881
[45] Date of Patent: Apr. 20, 1999

[54] FAN POWERED AFTERCOOLER AND CONTROL CIRCUIT FOR LOCOMOTIVE COMPRESSORS HAVING NO INTEGRAL AFTERCOOLER

[75] Inventors: Daniel G. Wagner, Pittsburgh; Walter E. Goettel, Monogahela; Brian L. Cunkelman, Blairsville, all of Pa.

[73] Assignee: Westinghouse Air Brake Company, Wilmerding, Pa.

[21] Appl. No.: 08/831,498

[22] Filed: Mar. 31, 1997

[51] Int. Cl.[6] ................................ G05D 23/00
[52] U.S. Cl. ............... 165/300; 62/93; 417/243; 417/14
[58] Field of Search ............. 165/47, 300; 62/93; 417/243, 14, 44.1, 18, 36

[56] References Cited

U.S. PATENT DOCUMENTS

| | | | |
|---|---|---|---|
| 1,805,101 | 3/1931 | Modine | 417/243 |
| 2,304,151 | 3/1942 | Crawford | 62/92 |
| 2,693,247 | 9/1954 | Olstad et al. | 62/92 |
| 2,783,616 | 11/1957 | Dodge | 62/92 |
| 2,784,571 | 2/1957 | Schelp | 62/92 |
| 4,830,580 | 5/1989 | Hata et al. | 417/243 |
| 5,106,270 | 4/1992 | Goettel et al. | 417/372 |

*Primary Examiner*—Ira S. Lazarus
*Assistant Examiner*—Terrell McKinnon
*Attorney, Agent, or Firm*—James Ray & Associates

[57] ABSTRACT

An electrical circuit for controlling the operation of a fan cooled aftercooler receiving pressurized air from a compressor located in a locomotive. The circuit includes a motor for driving the fan of the aftercooler, an electrical relay comprising a coil and contacts operated by the coil, and a temperature sensitive switch connected in electrical series with the coil. The contacts of the relay are connected in electrical series with the motor. The temperature sensitive switch is effective to open the circuit of the coil and thereby open the contacts to stop operation of the fan when ambient temperature falls to or below freezing.

11 Claims, 1 Drawing Sheet

5,894,881

FAN POWERED AFTERCOOLER AND CONTROL CIRCUIT FOR LOCOMOTIVE COMPRESSORS HAVING NO INTEGRAL AFTERCOOLER

FIELD OF THE INVENTION

The present invention relates generally to air compressors used on locomotives to supply pressurized air to brakes of the locomotives and to any railway cars connected to the locomotives, and particularly to a circuit for controlling the operation of an aftercooler unit connected to a locomotive compressor.

BACKGROUND OF THE INVENTION

Air entering a compressor under various relative humidity conditions is compressed on the order of 9.5 atmospheres. The compression process heats the air and allows the air to hold all the moisture (water vapor) it can contain. As air is compressed, its temperature rises rapidly and with each rise of about 20° F. its capacity to hold moisture almost doubles. However, as the air is compressed to a smaller and smaller volume, its ability to hold moisture decreases at approximately the same ratio of the increase of its ability to retain moisture with temperature increases. Thus, the greatly reduced volume of air finally leaving a compressor can have a temperature of about 400° F. to 500° F. and a relative humidity quite low at that temperature and reduce volume.

On locomotives, the compressor supplies pressurized air to one or more reservoirs or reservoir tanks for operating the air brakes of the locomotive and any railway cars connected to the locomotive. As the air enters the reservoirs from the compressor its temperature drops thereby reducing the moisture carrying capacity of the air while simultaneously expanding to increase this capacity. Any water laden air entering the reservoir and then supplied to the brakes of the locomotive and railway cars can be the cause of a substantial number of harmful effects in regard to brake hardware and equipment of the locomotive and cars. For example, such water laden air can wash away lubricants, cause rusting and excessive wear, all of which results in increased maintenance and maintenance costs.

The problems are made even more critical when the moisture freezes thereby effecting the ability of the brakes to operate at all as well as other safety devices on the locomotive using pressurized air such as windshield wipers, defrosters, bells and horns.

U.S. Pat. No. 5,106,270 to Goettel et al discloses a locomotive air compressor provided with an integral aftercooler (and integral intercoolers) that is effective to lower the temperature of the pressurized air leaving the compressor to that approaching atmospheric ambient. The disclosure of the Goettel et al Patent is incorporated herein by reference.

The benefits of the Goettel et al integral aftercooler are known in the railroad industry, yet not all locomotives are so equipped. Locomotives without such aftercoolers are in need of aftercoolers for the reasons discussed above.

An aftercooler uses a fan to pull or push outside ambient air past finned heat exchanger tubes receiving compressed air from the compressor. Since outside ambient air can be at a level that produces freezing of the moisture laden air in the aftercooler and in its discharge piping that feeds the locomotive reservoirs, there is a need to prevent the occurrence of freezing when the ambient temperature is at or below freezing.

SUMMARY AND OBJECTIVES OF THE INVENTION

The present invention supplies such a need by using a simple circuit that operates a relay supplying power to a motor that drives the fan of the aftercooler. The circuit includes a thermostatically controlled switch set at 32° F. When the temperature of the ambient air received by the aftercooler falls to or below 32° F., the switch opens the circuit of the fan motor. The fan stops rotating and the cooling effected by the fan is stopped. This reduces the possibility of freezing the condensate in the compressed air being received in the aftercooler from the compressor.

It is therefor an objective of the invention to provide a temperature sensitive control circuit for fan cooled aftercoolers on locomotives that do not have the above Goettel etal integral compressor/aftercooler.

If the temperature of the compressed air is reduced to that near ambient it does not have the ability to hold water in vapor form, as the vapor condenses to liquid water for removal from the reservoirs. Typically, compressed air is supplied to the reservoirs at say 130 psig and is stopped when reservoir pressure reaches say 140 psig. At these pressures compressed air received from the aftercooler is substantially free of water vapor. However, further expansion of the air takes place when it enters a regulating valve portion of the brake equipment that supplies air to the brakes of the locomotive and associated railway cars since the pressure involved is substantially lower than that in the reservoirs. This expansion provides opportunity for holding water vapor but the amount of such vapor is less than saturation.

The removal of liquid water eliminates the potential for freezing as well as prevents lubrication and rust problems.

DRAWINGS

Figure 1:
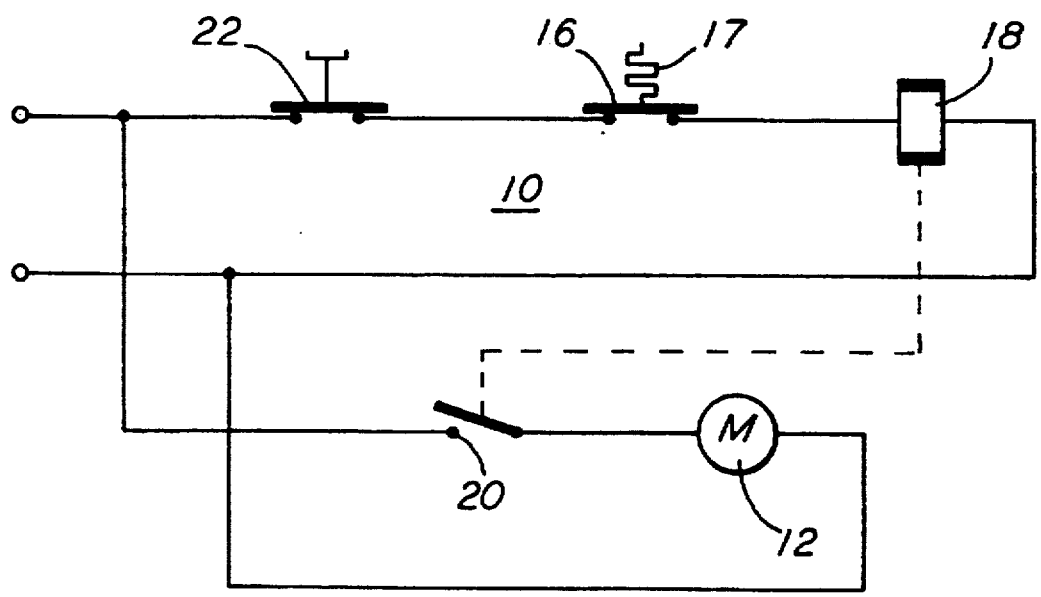

The advantages and objectives of the invention will be better understood with from consideration of the following detail description and the accompanying drawings in which:

FIG. 1 is a diagram of a circuit for controlling the motor of an aftercooler, and FIG. 2 is a sectional view of an aftercooler employed in the present invention.

PREFERRED EMBODIMENT

Referring now to the drawing, FIG. 1 shows a simple circuit 10 for controlling the operation of a fan motor 12 of an aftercooler 14 (FIG. 2) connected to receive moisture laden pressurized air from a locomotive compressor (not shown) via pipe 15. Circuit 10 uses thermostatically controlled switch contacts 16 (with a thermostat element depicted schematically at 17) connected in electrical series with the coil or solenoid 18 of a relay. The relay has contacts 20 mechanically operated by the coil and located in electrical series with fan motor 12. The motor can for example, be powered by 72 volts D.C., as locomotives in the United States use a seventy two volt D.C. (battery) system to power most electrical loads, though the circuit arrangement of the invention can, of course, be used in other than seventy two volt systems.

Circuit 10 preferably includes, in addition, a pressure sensitive switch 22 connected in electrical series with the temperature sensitive switch 16 and relay coil 18. Switch 22 is sensitive to the pressure in one or more main reservoir tanks of pressurized air (not shown) located on a locomotive. Switch 22 is mechanically operated by the level of air pressure in such reservoirs. The supply of air to the reservoirs from the compressor is controlled by pressure sensitive valves that open when reservoir pressure falls to say 130 psig and interrupts the supply of air to the reservoirs when reservoir pressure has increased to say 140 psig.

Typically, compressor switch 22 is located between number 1 and number 2 main reservoir tanks on a locomotive. It senses the main reservoir pressure. The locomotive compressor operates to supply air to the reservoirs at a pressure between 130 and 140 psig; at 140 psig the compressor unloads until the compressor pressure decreases to 130 where it then loads again.

FIG. 2 of the drawing shows an aftercooler 14 having an input pipe 15 for connecting to the output of a locomotive compressor (not shown). A second, output pipe 25 is provided for connecting the aftercooler to reservoirs of pressurized air located on the locomotive. Preferably, aftercooler 14 is located in an area of the locomotive receiving ambient air from outside of the locomotive so that the aftercooler can in fact lower the temperature of the compressed air it receives from the compressor. The aftercooler condenses water vapor contained in the compressed air to liquid water for removal from the reservoirs before the compressed air is sent on to brake systems of the locomotive and railway cars. The compressor is located in the area and compartment housing the diesel engine of the locomotive, as the diesel engine operates the compressor through rotation of a connecting drive shaft. The temperature in the engine compartment can be as high as high as 200° F. such that cooling compressed air from the compressor to near outside ambient is not possible at such temperature levels.

There is, however, an area in diesel engine compartments that receives outside ambient air, namely, inertial filter compartments. Inertial filters receive outside air for internal combustion of fuel in the cylinders of the diesel engine. As such, the compartments containing such inertial filters provide an ideal location for containing aftercooler 14 and temperature sensitive element 17.

Another possible way of obtaining ambient temperature air is to mount the aftercooler near the side of the locomotive body and provide louvers or screens in the side of the locomotive to access the ambient air.

Such outside ambient air can, of course, be below freezing (32° F.) such that the aftercooler 14, if operated continuously in the process of cooling water laden air received from the compressor, would aggravate the freezing problem by continuous cooling already cold air at a freezing temperature.

Circuit 10 of the invention provides interruption of the cooling effected by aftercooler 14 when the outside ambient is at or below freezing, and restorers the process of cooling outside ambient air when it rises to a level above freezing.

Circuit 10 operates in the following manner. Switch 16 and thermostat element 17 are located in a position on the locomotive to sense outside ambient conditions such that the thermostat element is effective to open and close switch contacts 16 with the rise above and the fall below freezing temperature of the outside air. When the outside ambient is above freezing, switch 16 is closed, and when the pressure in the reservoir tanks of the locomotive falls to say 130 psig, switch 22 is closed, as the tanks call for compressed air when it is needed. Thus, switch 22 is closed while the compressor and aftercooler supply compressed air to the reservoirs.

With switches 16 and 22 closed, electrical current is supplied to relay coil 18, which is then energized to close contacts 20. Closed contacts 20 complete the circuit of fan motor 12 such that battery power of the locomotive is supplied to motor 12 of the aftercooler. Blades 30 of a fan 32 (FIG. 2) of the aftercooler are now rotated to direct ambient air past finned tubing 34 of a heat exchanger 36 of the aftercooler at a rate sufficient to cool water laden air received from the compressor and directed through tubing 34. The ambient air directed past the finned tubing cools pressurized air in the tubing before being discharged through pipe 25 to locomotive reservoir tanks. Water vapor in the pressurized air directed to aftercooler 14 is thus condensed to liquid water in the aftercooler, which is then removed by gravity from the reservoir tanks.

However, if the outside ambient is at or below freezing, contacts 16 are opened by thermostat element 17 to open the circuit to relay coil 18 and the circuit of fan motor 12 by opening relay contacts 20. In this manner, the aftercooler 14 does not operate to cool an already freezing ambient. With the fan shut off the hot compressed air from the compressor still flows through the finned aftercooler. Thus, some portion of the cooling takes place even without the benefit of the cooling fan so that some moisture will precipitate out as liquid water.

While a presently preferred embodiment for carrying out the instant invention has been set forth in detail in accordance with the patent act, those persons skilled in the braking art to which this invention pertains will recognize various alternative ways of practicing the invention without departing from the spirit and scope of the claims appended hereto.

What is claimed is:

1. An electrical circuit for controlling the operation of a fan cooled aftercooler receiving pressurized air from a compressor located in a locomotive, comprising:

a motor for driving the fan of said aftercooler, an electrical relay comprising a coil and contacts operated by said coil, said contacts being located in electrical series between with the motor and a supply of electrical power for the motor, and a temperature sensitive switch located in electrical series with said coil, said temperature sensitive switch being effective to open the circuit of the coil and thereby open said contacts to interrupt the supply of electrical power to the motor when ambient temperature falls to or below freezing.

2. The circuit of claim 1 wherein a pressure sensitive switch is located in series with the relay coil and temperature sensitive switch.

3. The circuit of claim 2 wherein the pressure sensitive switch is a switch for governing the pressure in a reservoir of the locomotive, said reservoir being connected in fluid communication with the aftercooler to receive pressurized air from the compressor and aftercooler at a temperature near the temperature of ambient air outside of the locomotive.

4. The circuit of claim 3 wherein the pressure sensitive switch is normally set to supply air to the main reservoir when the pressure therein falls to a level of about 130 psig, and to interrupt said supply when the pressure in the reservoir rises to a level of about 140 psig.

5. The circuit of claim 1 wherein the aftercooler is located to receive ambient air from outside of a diesel engine compartment of the locomotive.

6. The circuit of claim 1 wherein the aftercooler is located in an inertial filter compartment of the locomotive.

7. A method of operating an aftercooler in a locomotive receiving pressurized air from a compressor in a manner that prevents freezing of moisture contained in the pressurized air in the aftercooler, said aftercooler including a fan and an electrical circuit containing an electrical motor for driving said fan, the method comprising:

using an electrical relay to open the circuit of said motor when outside ambient temperature falls to or below freezing.

8. The method of claim 7 including, using a pressure sensitive switch located in electrical series with a coil of said relay to open and close the circuit of said motor.

9. The method claim 8 including, using a temperature sensitive switch located in electrical series with the coil of said relay to open the circuit of the motor when outside ambient temperature falls to or below freezing.

10. The method of claim 7 including, locating the aftercooler to receive ambient air from a location outside of a diesel engine compartment.

11. The method of claim 7 including, locating the aftercooler in an inertial filter compartment of the locomotive.

* * * * *